June 24, 1930.  W. H. PRIESS  1,767,093

CONDENSER LEAD AND TERMINAL

Original Filed Aug. 31, 1921  2 Sheets-Sheet 1

INVENTOR

WILLIAM H. PRIESS
BY
ATTORNEY

June 24, 1930.  W. H. PRIESS  1,767,093
CONDENSER LEAD AND TERMINAL
Original Filed Aug. 31, 1921   2 Sheets-Sheet 2

INVENTOR
WILLIAM H. PRIESS
BY
ATTORNEY

Patented June 24, 1930

1,767,093

UNITED STATES PATENT OFFICE

WILLIAM H. PRIESS, OF MONTCLAIR, NEW JERSEY, ASSIGNOR TO WIRELESS SPECIALTY APPARATUS COMPANY, OF BOSTON, MASSACHUSETTS, A CORPORATION OF NEW YORK

CONDENSER LEAD AND TERMINAL

Original application filed August 31, 1921, Serial No. 497,113. Divided and this application filed October 1, 1924. Serial No. 740,917.

This application is a division of Serial No. 497,113, filed August 31, 1921.

This invention primarily relates to condenser lead and terminal.

The object of the invention is to provide an improved lead and terminal.

The invention consists of the features described in detail hereinafter and illustrated in the accompanying drawings, in which—

Figure 1:
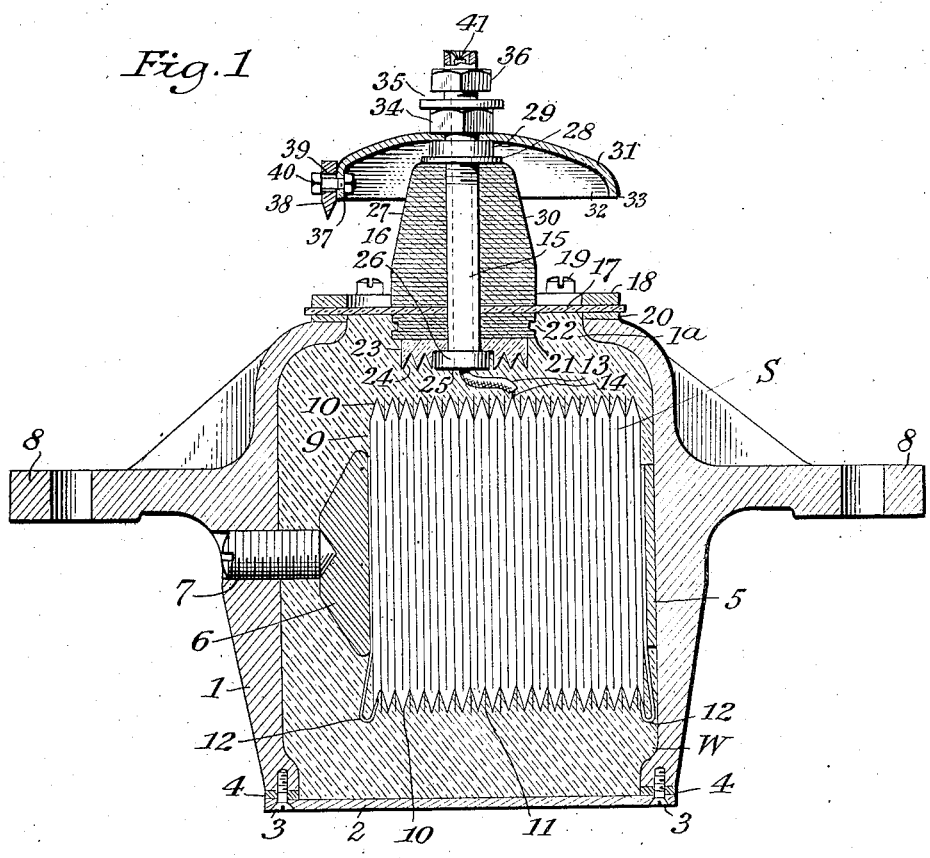
Figure 1 is a sectional elevation of the assembled condenser.
Figure 3:
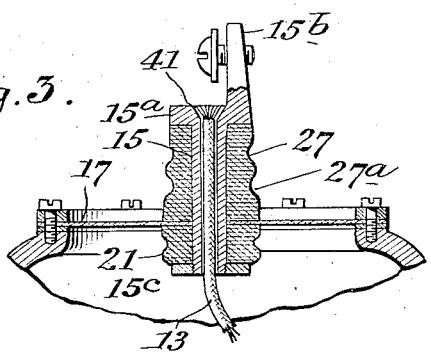
Fig. 3 is a sectional view of a modified form.
Figure 2:
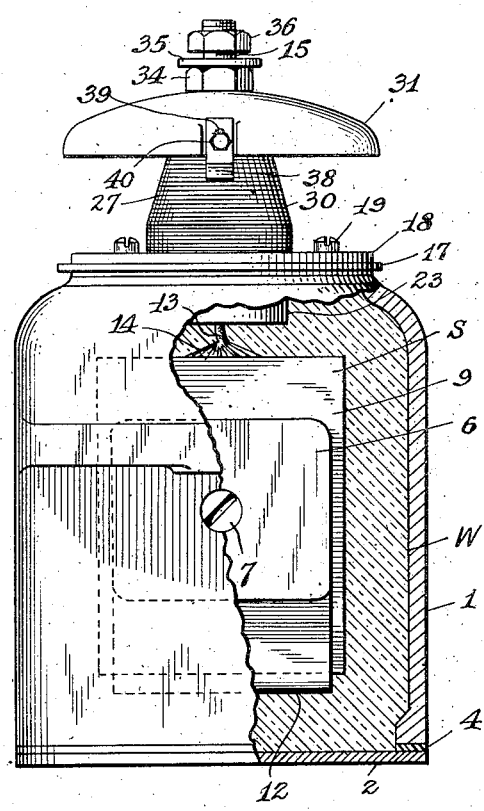
Fig. 2 is an elevation thereof with parts broken away.

These drawings show a complete electrostatic condenser (termed a "capacitor") and the invention is more particularly shown at 10, 14 and 41 (Figs. 1 and 3), at 41 and 13 (Fig. 3), and at 15 and 15ª (Figs. 2—3).

The condenser stack S, which is under pressure, comprises alternate sheets of foil, such as lead or tinfoil, and a dielectric, such as mica. By adjusting screw 7, any desired pressure, of the order of thousands of pounds, may be exerted upon the stack, forcing it against plate 5, the pressure plates 5 and 6 covering substantially the active area of the stack. The pressure upon stack S is of an order to maintain the sheets of foil and dielectric in intimate contact free from air and voids and as nearly devoid as possible of insulating material such as paraffin.

In the embodiment of the invention herein disclosed, the stack S comprises a number of sections 9 having their foil terminals connected in series alternately at opposite ends 10 by means of solder. Between the sections are located separators 11 preferably of mica. The terminals of the outermost sections or the sections at opposite ends of the stack have soldered to them copper strips or leads 12 which are bent around the ends of stack S and clamped between the plates 5 and 6 respectively and the stack S, being electrically connected together through casing 1.

In the embodiment of the invention herein disclosed, a high potential lead 13 is secured to one of the foil connections 10 at the central upper portion 14 of the stack whereby the stack S is connected in series parallel; that is, the two parts of the stack, one at each side of the lead 13, are connected in parallel, the individual parts comprising sections connected in series. Lead 13 is universally flexible and is a stranded wire, preferably copper; that is, a wire which is made up of a number of strands of very fine wire. The inner end of the lead 13 is flared or fanned out as shown at 14 more clearly in side view in Fig. 2, with the individual strands soldered at spaced or successive lines along the foil connection, whereby an electrically good and strong connection is secured between the flexible lead 13 and the foil-lead of stack S. The fanned-out lead soldered to the foil terminal is disclosed in my Patent 1,558,043 dated October 20, 1925, this present application constituting a continuation in part of said copending application as to this feature. In constructions heretofore used, it has been found that copper strips or similar connections when connected to the foil leads, which are very fragile, tend to become disconnected or torn therefrom and also tend to tear the foil terminals themselves. By the present invention, this difficulty is obviated and strong permanent means is provided for connecting the high potential lead to the stack.

Inasmuch as the high potential lead 13 must be thoroughly insulated from the casing 1, which is the low potential terminal, and in order to mount lead 13 permanently upon the casing but insulated therefrom, I provide a rigid terminal such as a metal tube 15 through which the lead 13 is threaded, as illustrated, the terminal 15 being located on the casing at a point remote from closure 2. The metal tube 15 projects through a suitable opening 1ª in the casing 1, and is thoroughly insulated from the casing by means of an insulating device 16. In the present embodiment, this insulating device comprises a disk or plate 17, of insulating material, which is of an area greater than the area of the opening 1ª within the casing and extending over the boundaries of said opening; this plate 17 being clamped inwardly of its edge to the casing 1 by means of a metal ring 18 and screws 19 passing through the ring 18 into the casing 1, a suitable lead or rubber gasket 20 being interposed between the mica sheet and the casing 1 to secure a tight joint. The tubular member 15 extends through the disk 17. Upon the top of the large mica plate 17 is an upper insulating bushing 27 of reduced diameter compared with disk 17 mounted thereon and surrounding and insulating the upper portions of the member 15.

Above nut 29, in close contact with the nut and member 15, is a concavo-convex metal member 31, having its concave side 32 facing the upper bushing 27 and having its edge 33 in vertical alinement with and spaced from the clamping ring 18. The member 31 provides a large-surfaced terminal for radiating heat generated in the stack and conducted through the lead 13 to member 31. The member 31 also serves as a protector or dust-guard for the insulating device 16, preventing deterioration thereof; that is, it is located above the insulating disk 17 and the bushing 27. The corona member 31 is secured in place by means of a nut 34 threaded upon the upper portion of the tubular member 15, and above this are located washer 35 and nut 36 whereby any suitable lead may be attached to the high potential terminal in the usual manner.

Stack S of the present invention may be constructed and assembled in part in the manner described in my patent 1,652,212, dated December 13, 1927. The process therein described covers the manufacture of a stack by preliminarily dipping the individual sheets of mica in suitable insulating material, such as paraffin, and building what is called the material stack consisting of alternate sheets of foil and dielectric, and then treating the material stack thus formed in molten insulating material, such as paraffin and applying high compression and cooling, forming a solid block. After this, the material stack is split up into sections, such as the sections 9 of Fig. 1. The projecting foil terminals are connected as at 10, and the insulating separators 11 inserted between sections 9. Of course, the sections may be assembled and connected by any desired method. For instance, each section may be built up under wax, heated, compressed and cooled under pressure. Each section then is tested for capacity and voltage. The sections then are connected in series (at 10) and 11 separators inserted between them. After the sections have been connected by soldering together the foil-tabs of adjacent sections, at 10, and the sectional separators 11 positioned, the high potential flexible lead 13 is soldered in a fanned-out manner to a surface of the intermediate foil connection 10, and the two low potential leads 12 are soldered to the free ends of the end sections. The stack then is given any desired treatment before being placed in its casing of Fig. 1.

After the stack S, including the separators 11, has been so treated as in a bath of hot molten insulating material, it is in condition to be handled, being cold and covered with wax and, with lead 13 in place as at 14 (i. e., anchored at its lower end to the stack), the stack is directly secured within the casing 1 by means of the clamping members 5 and 6 and adjusting screw 7. The terminal gasket 20 is then positioned and the upper end of flexible lead 13 pulled up through the vertical hole through the tubular member 15. The insulator 16, including the disk 17, is then clamped to the casing 1 by means of ring 18 and screws 19. The stranded fine wire lead 13 is then pulled up taut through member 15 and its excess length above the latter is cut off. The outer end of lead 13 is then soldered to the top of member 15, which is provided at its upper end with a recess or countersunk portion 41 (Figs. 1 and 8) which is filled with solder, retaining the stranded lead 13 in place as shown most clearly in Fig. 3 (its soldered end being fanned or flared out as shown) and electrically connecting it to member 15 at a location outside casing 1 which is accessible for inspection, and without interference with the parts which are threaded on the outside of tubular member 15.

Inasmuch as I have utilized in the present invention the stranded wire 13, the strands at their outer ends (top, Figs. 1 and 3) provide additional means for securing a very good electrical and mechanical connection with the terminal 15. After the parts have been assembled as illustrated in the drawings, with stack S held by members 5 and 6 under sufficient pressure to hold it in place, the whole condenser can be inverted, the bottom 2 being removed, and the same embedded in the manner described in my Patent 1,652,212 above-mentioned to provide a compact, non-porous, holosteric embedment W for the stack and around the portions of lead 13 and terminal 15 which extend within the condenser 1, inside of 17. This embedment is free from air and voids and embeds with particular utility those foils of the foil-connections 10 which are soldered to the ends 14 of the separated very fine wires of stranded lead 13, and also supports in the embedment the portions of the separated fine wires (14, Fig. 2) which are not soldered to the foils and also permanently aids the solder in holding the end portions of such fine wires to the surface of the foils 10 projecting from two adjacent sections and bunched together and themselves soldered together as above described. The diameter of the passage through member 15 should be such as to allow lead 13 to be pulled up through it before embedment W is cast, and yet to allow the solder at 41, (applied after the lead has been pulled up and its very fine wires separated at the top), to make a tight joint closing the top of member 15. After the embedment, the bottom 2, with its intervening gasket 4, is secured in place by means of the screws 3, the closure 2 being flexible, to allow the expansion of the wax, if required.

The soldering of the fanned-out stranded wire lower end to the foils of mid-point series connection 10 is a distinct advantage in cases of condensers having sections of low capacity, that is, having a small number of foils in a tab, because the smaller the number of foils in a single tab, the more easily the foils are torn.

The lead 13 is secured to the terminal 15 of Fig. 3 in the manner described in connection with Figs. 1 and 2; that is, as shown, by flaring or fanning out the individual strands and soldering them in successive lines around the surface of recess 41, whereby a very strong connection is made between the upper end of lead 13 and the stud 15, in a manner similar to the making of the strong connection between the lower end of lead 13 and the stack, i. e., by being individually secured at successive or spaced lines on the surface of a bunch of projecting foils constituting the tab. This separate securing of the small individual strands of lead 15 to the interior wall of stud 15, particularly in the solder-filled depression 41, provides a much stronger electrical and mechanical connection than by soldering a short or large wire as the lead. Thus both ends of lead 13 may be secured between and to the stack and the condenser terminal in strong fashion; and particularly, at the lower end, the distribution of the spread very fine wires on the surface of the foil tab results in a sufficiently strong connection notwithstanding the fragility of the foils themselves and of the very fine wires themselves, in that the fine wires, when spread out, provide a fragile structure somewhat like the foils in fragility, the combination of foils and spread very fine wires being a structure wherein the mechanical strains are equalized so that the stranded wire 13 is quite strongly secured to the foil-tab and is itself, in its stranded form beyond the tab, very strong, in a way as the foils inside the stack are strong in their compressed relation therein. That is, where the foils and lead 13 are joined together by this invention, the structure is a great improvement on the prior soldering of a relatively thick copper strip to the foil tab. And here, where the separated very fine wires extend individually beyond the foil-tab to their lead 13, the wax embedment W constitutes a desirable support therefor.

It is to be understood that the invention is not limited to the embodiments and features specifically shown and described herein, but that such embodiments and features are subject to changes and modifications without any departure from the spirit of the invention.

I particularly point out and distinctly claim the part, improvement or combination which I claim as my invention or discovery, as follows:—

1. A capacitor stack comprising sheets of foil and dielectric material, means for clamping said stack, at least one of said foils projecting as a tab from a side of said stack, and a terminal lead connected to said projecting foil tab, said lead being of reduced thickness and spread out on each side of the lead axis where attached to said foil to increase the area of contact between the foil and lead, the spread out portion of the lead being soldered to the foil tab substantially centrally of the projecting foil and the lead being largely within a plane substantially normal to the plane of the adjacent side of the stack whereby any pull on the lead transmits tension to the foil in a manner to reduce likelihood of tearing one edge of the projecting foil tab more than another.

2. A capacitor stack comprising sheets of foil and dielectric material, means for clamping said stack, and a terminal lead connected to a foil of said stack, said lead being of reduced thickness and spread out on each side of the lead axis where attached to said foil to increase the area of contact between the foil and lead, the spread out portion of the lead being secured to the foil in such manner that any tension on the lead is transmitted substantially equally to the connected portions of foil whereby there is no greater stress applied to the foil on one side of the lead than on the other.

3. A capacitor stack comprising sheets of foil and insulating material, means for clamping said stack, at least one of said foils projecting as a tab from one side of said stack, and a stranded conductor connected to said projecting foil tab, said conductor being of reduced thickness and the strands thereof fanned out on each side of the conductor axis where attached to the foil to increase the contact area between foil and conductor, the fanned out strands being soldered to the foil tab substantially centrally of the projecting tab and the conductor adjacent said fanned out portion being in a plane substantially normal to the plane of the adjacent side of the stack whereby any pull on the conductor transmits tension to the foil in a manner to reduce likelihood of tearing one edge of the foil tab more than another.

WILLIAM H. PRIESS.